United States Patent
Ghafoor et al.

(10) Patent No.: US 10,467,418 B2
(45) Date of Patent: Nov. 5, 2019

(54) COMPUTER PRE-BOOT SECURITY VERIFICATION, ENFORCEMENT, AND REMEDIATION

(71) Applicant: NCR Corporation, Duluth, GA (US)

(72) Inventors: Gameelah Ghafoor, Scotland (GB); Graham Flett, Scotland (GB)

(73) Assignee: NCR Corporation, Atlanta, GA (US)

( * ) Notice: Subject to any disclaimer, the term of this patent is extended or adjusted under 35 U.S.C. 154(b) by 552 days.

(21) Appl. No.: 14/838,711

(22) Filed: Aug. 28, 2015

(65) Prior Publication Data

US 2017/0061130 A1     Mar. 2, 2017

(51) Int. Cl.
| | |
|---|---|
| *G06Q 20/00* | (2012.01) |
| *G06F 21/57* | (2013.01) |
| *G06F 9/4401* | (2018.01) |
| *G06Q 20/18* | (2012.01) |
| *G06Q 20/20* | (2012.01) |

(52) U.S. Cl.
CPC .......... *G06F 21/577* (2013.01); *G06F 9/4406* (2013.01); *G06F 21/575* (2013.01); *G06Q 20/18* (2013.01); *G06Q 20/206* (2013.01); *G06F 2221/034* (2013.01)

(58) Field of Classification Search
CPC .................................................... G06F 21/577
USPC ........................................................ 705/18
See application file for complete search history.

(56) References Cited

U.S. PATENT DOCUMENTS

| | | | | |
|---|---|---|---|---|
| 7,849,011 B1* | 12/2010 | McCoy | ................. | G06F 21/575 705/35 |
| 9,240,924 B2 | 1/2016 | Maity et al. | | |
| 9,256,745 B2 | 2/2016 | Anderson et al. | | |
| 2012/0226895 A1* | 9/2012 | Anderson | ............. | G06F 21/575 713/2 |
| 2015/0081829 A1* | 3/2015 | Maity | ................... | H04L 41/082 709/212 |

OTHER PUBLICATIONS

Anonymous: "Intelligent Platform Management Interface—Wikipedia", Aug. 27, 2015 (Aug. 27, 2015), XP055333669, Retrieved from the Internet: URL:https://en.wikipedia.org/w/index.php?title=Intelligent_Platform_Management_interface&oldid=678176241 [retrieved on Jan. 10, 2017] *the whole document*.
European Search Report dated Jan. 23, 2017 issued in co-pending European Patent Application 16180355.6.

* cited by examiner

*Primary Examiner* — Rokib Masud
(74) *Attorney, Agent, or Firm* — Schwegman, Lundberg & Woessner

(57) ABSTRACT

Various embodiments herein each include at least one of systems, methods, and software for computer pre-boot security verification. Some embodiments are implemented during a boot sequence of a computer that controls Self-Service Terminal (SST) operation before a main Operating System (OS) of the computer is loaded. One such embodiment in the form of a method includes starting a pre-boot OS upon start of a computer that controls operation of an SST and identifying any variances between a current state of the computer and data representative of a reference state within a computing environment of the pre-boot OS. This example method further includes performing at least one remedial action when any variance is identified and launching a main OS and stopping and unloading the pre-boot OS when no variance is identified.

17 Claims, 3 Drawing Sheets

COMPUTER PRE-BOOT SECURITY VERIFICATION, ENFORCEMENT, AND REMEDIATION

BACKGROUND INFORMATION

Self-Service Terminals (SSTs), such as Automated Teller Machines (ATMs) and Self-Service Checkout Stations (SSCS), have a computer that controls operation of the various devices coupled thereto, including currency dispensers. SST computers are therefore secured to prevent fraud, such as unauthorized dispensing of currency. However, SSTs are still subject to attack through manipulation of SST computer configuration and malware. The result can be significant as the average loss from such attacks averages $150,000 per ATM and multiple ATMs are commonly concurrently attacked. However, not all SST losses are due to attacks. Some losses occur following servicing due to technicians failing to fully return an SST to a secured state, such as by failing to return a boot device order or other configuration setting to a proper secure setting.

SUMMARY

Various embodiments herein each include at least one of systems, methods, and software for computer pre-boot security verification, such as during a boot sequence of a computer that controls SST operation before a main Operating System (OS) of the computer is loaded.

One such embodiment in the form of a method includes starting a pre-boot OS upon start of a computer that controls operation of an SST and identifying any variances between a current state of the computer and data representative of a reference state within a computing environment of the pre-boot OS. This example method further includes performing at least one remedial action when any variance is identified and launching a main OS and stopping and unloading the pre-boot OS when no variance is identified.

Another method embodiment includes launching, on a computing device of an SST, a pre-boot OS from a platform layer system (e.g., a Basic Input/Output System (BIOS) or Unified Extensible Firmware Interface (UEFI)) prior to launching of a main operating system of the SST that controls operation of the SST when active to conduct transactions. The method further includes launching a verification program within the pre-boot OS. In some embodiments, the verification program is executable by a processor of the SST computing device to perform data processing activities including identifying any variances between a current SST computing device state and data representative of a reference state. The data processing activities further include performing at least one remedial action when the verification program identifies variance between the current SST computing device state and the reference state. The data processing activities, when the verification program does not identify variance between the current SST computing device state and the reference state, then launches the main OS and stops and unloads the pre-boot OS.

A further embodiment is in the form of an SST. The SST of such embodiments includes a computer that controls operation of the SST. The computer includes a motherboard with at least one processor and at least one memory device thereon. The at least one memory device stores a platform layer system, a pre-boot OS, a main OS, a variance identification program, at least one SST controlling program, and configuration settings thereof. The platform layer system, such as a BIOS or UEFI, executes according to the configuration settings on the at least one processor to control booting of the computer and to launch the pre-boot OS on the computer prior to a launching of the main OS the at least one SST controlling program that executes therein. In some such embodiments, the variance identification program is executable by the at least one processor to perform data processing including identifying any variances between a current state of the computer and data representative of a reference state. The data processing activities further include performing at least one remedial action when any variance is identified and launching the main OS and stopping and unloading the pre-boot OS when no variance is identified.

DETAILED DESCRIPTION

Figure 1:
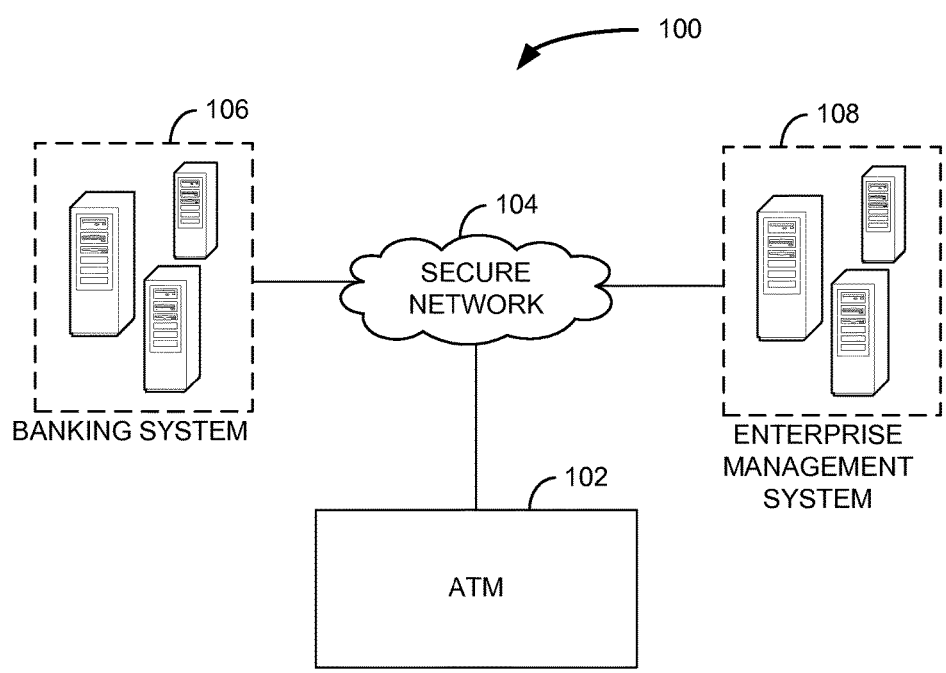
FIG. 1 is a logical block diagram of a system, according to an example embodiment.

Various embodiments herein each include at least one of systems, methods, and software for computer pre-boot security verification, such as during a boot sequence of a computer that controls SST operation before a main OS of the computer is loaded. Some such embodiments include executing a process or program on the computer before the main OS of the computer is loaded and takes control of the computer to put the SST, such as an ATM, in an operational condition for conducting transactions. The process or program executes to obtain current state information about the computer and to compare the current state information with expected state information that is retrieved in whole or part from one or both of data storage of the computer and a network storage location or service. When the comparison is successful, meaning the comparison yielded no, or acceptable, variance, the main OS is loaded and the process or program ceases operation. However, when the comparison is not successful, meaning the comparison yielded a mismatch between the current state of the computer and the expected state, various data processing activities can be performed.

In some embodiments, the data processing activities may include not allowing the main OS of the computer to load thereby preventing the computer from placing the SST in an operational condition for conducting transactions. In some such embodiments, an alert may be communicated indicating the noted comparison failure in the form of an email, text message, storing of data in a repository of an enterprise SST management system or other system, and the like to inform a responsible individual or to trigger a maintenance workflow process. However, in some embodiments, further remedial data processing activities may be performed or triggered by the process or program. These further remedial data processing activities may include restoring the SST computer to a last known state that successfully passes the comparison, downloading a full or partial software and data image for the SST computer and overwriting a current image to place the SST computer in an comparison-compliant state, executing a malware removal process, and the like. In some such embodiments, the boot process may then be restarted and the boot process of the SST computer executes again to verify the updated current state of the SST computer successfully compares with the expected state.

Some such embodiments may include a pre-boot OS, such as a LINUX® derivative OS, that is loaded by a platform layer system (e.g., a BIOS or UEFI,) of the SST computer prior to loading a main OS within which SST controlling and operational software executes. The main OS is only allowed to load and execute in such embodiments upon a successful comparison by a process of the pre-boot OS or a program that is launched and executed therein. Additional programs or processes may also be present and execute within the pre-boot OS environment, such as for virus and malware checking and removal and the like. Thus, the comparing of the current state information with expected state information may include comparing a result of a program or process such as for virus and malware checking and removal, with an expected result indicating no such threats are present on the SST computer.

These and other embodiments are described herein with reference to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software, or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

A platform layer system is software system that first executes upon initialization of a computing device, such as a PC-based computer that controls operation of an SST. Examples of a platform layer system include a BIOS and a UEFI. Such a platform layer system, when deployed with an SST, is typically secured to prevent tampering which can be exploited to alter or control operation of the SST for purposes of committing theft, fraud, and other illicit acts.

FIG. 1 is a logical block diagram of a system 100, according to an example embodiment. The system 100 includes an SST, such as an ATM 102, that is connected to a banking system 106 and an enterprise management system 108 via a secure network 104.

The secure network 104 is typically a network dedicated at least in part to communicating with SSTs, such as an ATM network. The secure network 104 may rely on secure networking protocols that allow secure data to be carried on other networks, such as the Internet. However, in some embodiments, the secure network 104 may be, at least in part, a physically secured network. The banking system 106 is generally a system involved in processing at least financial portions of transactions conducted via an SST, such as the ATM 102 and SSCS. The enterprise management system 106 is a system that monitors performance of SSTs, such as the ATM 102.

In operation, a platform layer system is first loaded on a computer controlling the ATM 102, or other SST-type, to initialize the computer and to load a main OS thereof, such as a MICROSOFT® WINDOWS® operating system on which software that controls operation of the ATM 102 in conducting transactions. However, the various embodiments herein introduces a pre-boot OS that is first loaded on the ATM 102 controlling computer by the platform layer system. The pre-boot OS, in some embodiments, is an OS that provides at least basic functions on the computer for accessing data stored thereon and to communicate with various devices coupled thereto. Such devices may include a card reader, a currency dispenser, one or both of currency and check receiver, a printer, an encrypted Personal Identification Number (PIN) pad, a display that may be a touch-screen display, and other devices. In some embodiments, only certain data or functions of these devices may be manipulated or performed from within the pre-boot OS, such as to prevent dispensing by a currency dispenser and therefore fraudulent attacks within the pre-boot OS environment. The pre-boot OS may be a LINUX®-based operating system in some embodiments.

The pre-boot OS, once loaded, executes a verification process, which may be a module of the pre-boot OS or may be a program that executes within a computing environment of the pre-boot OS. The verification process or program executes to verify a current state of the ATM 102 controlling computer is in an expected, secure state. By executing the verification process or program prior to loading the main OS of the ATM 102 controlling computer, the software that controls operation of the ATM 102 in conducting transactions has not yet loaded and cannot be manipulated to compromise the ATM 102. For example, rogue software present on an ATM 102 as part of an attack and insecure configuration settings of the ATM 102 computer, the main OS, and devices that may be attached thereto (e.g., Universal Serial Bus (USB) memory devices) can be identified prior to exploitation within the computing environment of the main OS.

In some embodiments, the verification process or program executes to identify any variances between a current ATM 102 computer state and data representative of an expected state. The current ATM 102 computer state may be a subset of configuration settings and properties of the ATM 102 computer, the main OS, a firewall, one or more devices coupled to the ATM 102 computer, the platform layer system, and the like. The configuration settings and properties considered may be a fixed set hard coded in the verification process or program or may be set as configuration settings stored on the ATM 102 computer or retrievable via a network. The current ATM 102 state may also include information or data determined or collected by another program or process that may be called by the verification process or program. For example, a virus and malware detection and removal program that executes within the pre-boot OS may be called to identify the presence of viruses and malware on the ATM 102 computer and to affect removal thereof.

Once the current state of the ATM 102 computer is identified, the verification process or program then compares the current state data with expected state data, also referred to herein as a reference state or reference state data. The expected state data may be retrieved from one or both of a storage device of the ATM 102 computer and from one or more network locations. The expected state data may be one or more and combinations of configuration settings and properties of the ATM 102 computer, the main OS, a firewall, one or more devices coupled to the ATM 102 computer, the platform layer system, and the like. The expected state data may also be an expected result of a process or program called by the verification process or program, such as an output of a virus and malware detection and removal program.

When the verification process or program does not identify variance between the current SST computing device state and the expected state, the verification process or program launches the main OS and stops and unloads the pre-boot OS.

However, when the verification process or program identifies variance between the current state of the ATM 102 and the expected state, the verification process or program performs at least one remedial action. A remedial action may simply be shutting down the ATM 102 controlling computer. Some embodiments may also include sending an alert message to an individual or an alert message repository accessible by responsible individuals. The alert message may be an email, a text message, a voice mail, and the like. An alert message may also or alternatively transmitted to the enterprise management system 108. An alert message transmitted to the enterprise management system 108 may trigger a workflow process within the enterprise management system 108 or other system for arranging maintenance for the ATM 102.

In some further embodiments, a remedial action may also or alternatively include restoring a non-compliant configuration setting or property to a last known compliant value as may be cached on a storage device of the ATM 102 computer or may be retrieved over the secure network 104 or other network. As there may potentially be many variance-types, some embodiments include a database of variance-types each mapped to one or more data processing actions to perform to remediate the respective variance-type. Thus, when a variance is identified, the database may be consulted to identify one or more remedial activities to be performed to restore the ATM 102 computer to a compliant state. The database of variance-types may be stored locally by the ATM 102 computer or may be accessed via the secure network 104 or other network.

In some embodiments, a remedial action may include reimaging all or a portion of storage device of the ATM 102 computer from an image stored on another storage device or as may be retrieved over the secure network 104 or other network, such as from or through the enterprise management system 108 or other networked storage location. In embodiments where the remedial action is more than just transmitting a message and shutting down the ATM 102 controlling computer, the ATM 102 controlling computer may then reboot and the boot process is restarted followed by the loading of the pre-boot OS and execution of the verification process or program. When the verification process or program does not identify variance between the current SST computing device state and the expected state during a subsequent boot, the main OS is loaded and the ATM 102 is placed in a ready state for conducting transactions.

Figure 2:
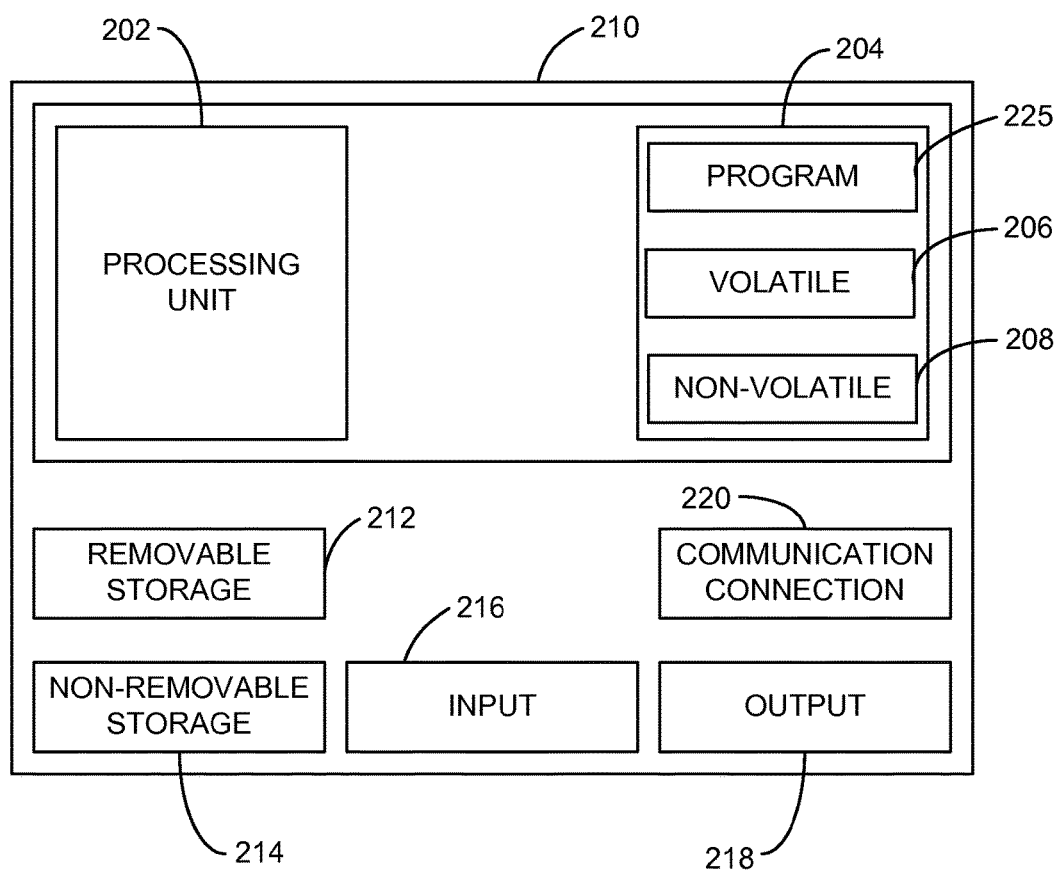
FIG. 2 is a block diagram of a computing device, according to an example embodiment.

FIG. 2 is a block diagram of a computing device, according to an example embodiment. In one embodiment, multiple such computer systems are utilized in a distributed network to implement multiple components in a transaction-based environment, such as in each of the ATM 102, the enterprise management system 108, and banking system 106, each of FIG. 1. The computing device is also an example of a computer that may be deployed in other SST-types, such as a SSCS. An object-oriented, service-oriented, or other architecture may be used to implement such functions and communicate between the multiple systems and components. One example computing device in the form of a computer 210, may include a processing unit 202, memory 204, removable storage 212, and non-removable storage 214. Memory 204 may include volatile memory 206 and non-volatile memory 208. Computer 210 may include— or have access to a computing environment that includes—a variety of computer-readable media, such as volatile memory 206 and non-volatile memory 208, removable storage 212 and non-removable storage 214. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 210 may include or have access to a computing environment that includes input 216, output 218, and a communication connection 220. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 202 of the computer 210. A hard drive (magnetic disk or solid state), CD-ROM, and RAM are some examples of articles including a non-transitory computer-readable medium. For example, a pre-boot OS, various computer programs 225 or apps, such as a verification program and one or more other applications and modules called thereby for implementing one or more of the methods illustrated and described herein, may be stored on a non-transitory computer-readable medium.

Figure 3:
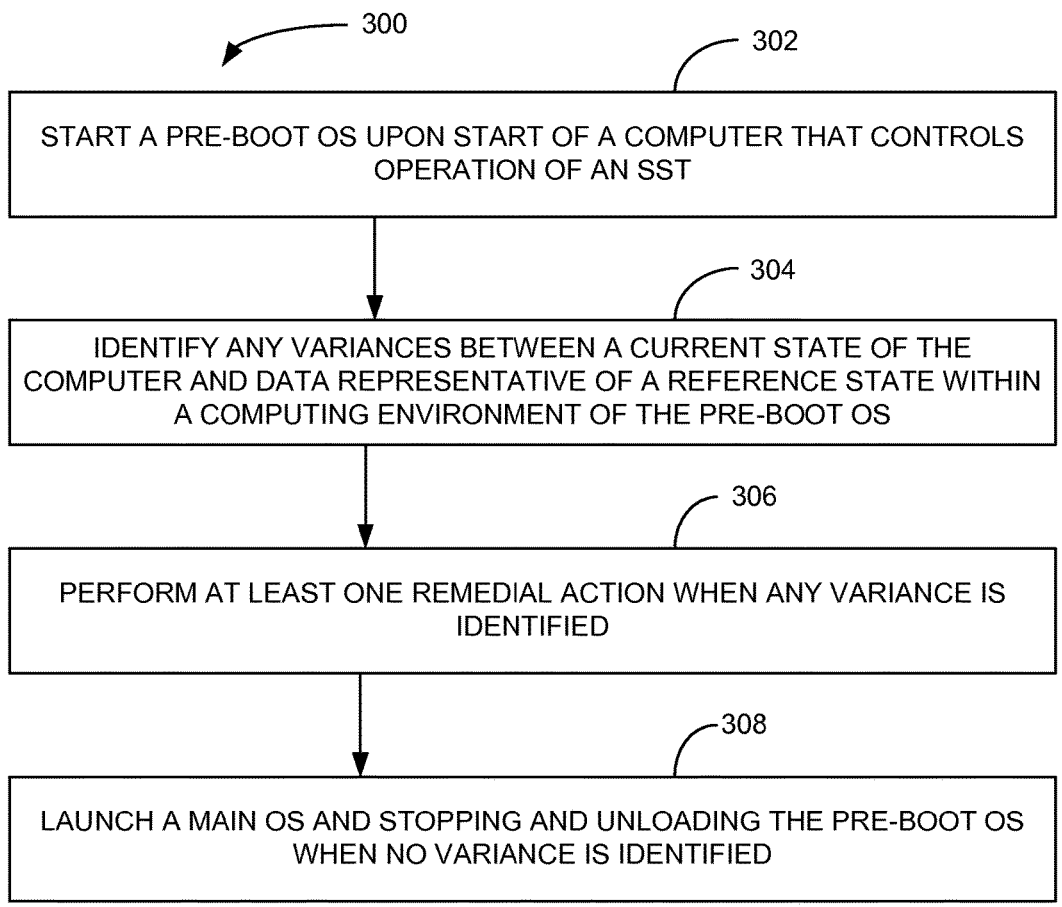
FIG. 3 is a block flow diagram of a method, according to an example embodiment.

FIG. 3 is a block flow diagram of a method 300, according to an example embodiment. The method 300 is an example of a method that may be performed on an SST computer following start of the SST computer. The example method 300 includes starting 302 a pre-boot OS upon start of a computer that controls operation of a Self-Service Terminal SST. The method 300 then identifies 304 any variances between a current state of the computer and data representative of a reference state within a computing environment of the pre-boot OS. Note that the variances are identified within not only the pre-boot OS environment but also differences in configuration settings and properties represented in data stored on the computer with regard to the main OS and programs that execute therein as well as with regard to devices of the computer and other devices that may be connected thereto. The method 300 further includes performing 306 at least one remedial action when any variance is identified and launching 308 a main OS and stopping and unloading the pre-boot OS when no variance is identified.

In some embodiments of the method 300, variances are identified 304 based at least in part upon current computer configuration settings and properties including a plurality of configuration settings and properties of a platform layer system, the main operating system, data stored by the computer, devices connected to the computer, a firewall, and a threat detection program. In some such embodiments, the data representative of the reference state includes data representative of expected configuration settings and properties. The data representative of expected configuration settings and properties may include a plurality of platform layer system, main operating system, stored data, device, firewall, and threat detection program configuration settings and properties. In such embodiments, 304 identifying any variances between the current computer state and the reference state includes comparing the current computer configuration settings and properties and the data representative of the reference state. In some such embodiments, at least a portion of the data representative of the reference state is retrieved over a network via a network interface device of the computer.

In some additional embodiments of the method 300, the at least one remedial action includes identifying a remedial data processing action to resolve an identified variance where the remedial data processing action identified based on the identified variance. These embodiments may then perform the remedial data processing action and then re-identify any variances between the current computer state and the data representative of the reference state. The method 300 may then again performing at least one remedial action when the verification program identifies the same or a different variance between the current computer state and the reference state. Once all variances have been resolved, or any variances identified are deemed acceptable, such embodiments may then launch the main OS and stop and unload the pre-boot OS.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
   starting a pre-boot Operating System (OS) upon start of a computer that controls operation of a Self-Service Terminal (SST);
   identifying any variances between a current state of the computer and data representative of a reference state within a computing environment of the pre-boot OS, the variances identified based at least in part upon current computer configuration settings and properties including a plurality of configuration settings and properties of a platform layer system, the main operating system, data stored by the computer, devices connected to the computer, a firewall, and a threat detection program;
   performing at least one remedial action when any variance is identified, the at least one remedial action including:
      identifying a remedial data processing action to resolve an identified variance, the remedial data processing action identified based on the identified variance;
      performing the remedial data processing action;
      re-identifying any variances between the current computer state and the data representative of the reference state;
      performing at least one remedial action when the verification program identifies the same or a different variance between the current computer state and the reference state; and
      launching the main OS and stopping and unloading the pre-boot OS when the verification program does not re-identify variance between the current computer state and the reference state; and
   launching a main OS and stopping and unloading the pre-boot OS when no variance is identified.

2. The method of claim 1, wherein:
   the data representative of the reference state includes data representative of expected configuration settings and properties including a plurality of platform layer system, main operating system, stored data, device, firewall, and threat detection program configuration settings and properties; and
   identifying any variances between the current computer state and the reference state includes comparing the current computer configuration settings and properties and the data representative of the reference state.

3. The method of claim 2, wherein at least a portion of the data representative of the reference state is retrieved over a network via a network interface device of the computer.

4. A method comprising:
   launching, on a computing device of a Self-Service Terminal (SST), a pre-boot Operating System (OS) from a platform layer system prior to launching of a main operating system of the SST that controls operation of the SST when active to conduct transactions, and
   launching a verification program within the pre-boot OS, the verification program executable to perform data processing activities comprising:
      identifying any variances between a current SST computing device state and data representative of a reference state, the variances identified based at least in part upon current SST configuration settings and properties including a plurality of configuration settings and properties of a platform layer system, the main operating system, data stored by the SST, devices connected to the SST, a firewall, and a threat detection program;
      performing at least one remedial action when the verification program identifies variance between the current SST computing device state and the reference state and returning to the identifying; and
      launching the main OS and stopping and unloading the pre-boot OS when the verification program does not identify variance between the current SST computing device state and the reference state.

5. The method of claim 4, wherein:
   the data representative of the reference state includes data representative of expected configuration settings and properties including a plurality of platform layer system, main operating system, stored data, devices connected to the SST computing device, firewall, and threat detection program configuration settings and properties; and the verification program identifies variances between the current SST computing device state and the data representative of the reference state by comparing the current SST configuration settings and properties and the data representative of the reference state.

6. The method of claim 5, wherein the data representative of the reference state is retrieved over a network via a network interface device of the SST computing device.

7. The method of claim 4, wherein the at least one remedial action includes preventing the SST from being enabled for conducting transactions.

8. The method of claim 7, wherein the at least one remedial action further includes transmitting a notification of the identified variance between the current SST computing device state and the reference state to a notification repository.

9. The method of claim 4, wherein the at least one remedial action includes:

identifying a remedial data processing action to resolve the variance, the remedial data processing action identified based on an identified variance;

performing the remedial data processing action;

re-identifying any variances between the current SST computing device state and the data representative of the reference state;

performing at least one remedial action when the verification program identifies the same or a different variance between the current SST computing device state and the reference state; and launching the main OS and stopping and unloading the pre-boot OS when the verification program does not re-identify variance between the current SST computing device state and the reference state.

10. The method of claim 4, wherein the computer platform layer system is a Basic Input/Output System (BIOS).

11. The method of claim 4, wherein the computer platform layer system is a Unified Extensible Firmware Interface (UEFI).

12. The method of claim 4, wherein the SST is an Automated Teller Machine (ATM).

13. A Self-Service Terminal (SST) comprising:

a computer that controls operation of the SST, the computer including a motherboard with at least one processor and at least one memory device thereon, the at least one memory device storing a platform layer system, a pre-boot Operating System (OS), a main OS, a variance identification program, at least one SST controlling program, and configuration settings thereof, the platform layer system executable according to the configuration settings by the at least one processor to control booting of the computer and to launch the pre-boot Operating System (OS) on the computer prior to a launching of the main OS and the at least one SST controlling program that executes therein; and the variance identification program executable by the at least one processor to perform data processing activities comprising:

identifying any variances between a current state of the computer and data representative of a reference state, the variances identified based at least in part upon current computer configuration settings and properties including a plurality of configuration settings and properties of a platform layer system, the main operating system, data stored by the computer, devices connected to the computer, a firewall, and a threat detection program;

performing at least one remedial action when any variance is identified and restarting the data processing activities; and launching the main OS and stopping and unloading the pre-boot OS when no variance is identified.

14. The SST of claim 13, wherein:

the data representative of the reference state includes data representative of expected configuration settings and properties including a plurality of platform layer system, main operating system, stored data, device, firewall, and threat detection program configuration settings and properties; and identifying any variances between the current computer state and the reference state includes comparing the current computer configuration settings and properties and the data representative of the reference state.

15. The SST of claim 14, wherein:

the computer further includes a network interface device; and at least a portion of the data representative of the reference state is retrieved over a network via the network interface device.

16. The SST of claim 13, wherein the at least one remedial action includes:

identifying a remedial data processing action to resolve an identified variance, the remedial data processing action identified based on the identified variance;

performing the remedial data processing action;

re-identifying any variances between the current computer state and the data representative of the reference state;

performing at least one remedial action when the verification program identifies the same or a different variance between the current computer state and the reference state; and launching the main OS and stopping and unloading the pre-boot OS when the verification program does not re-identify variance between the current computer state and the reference state.

17. The SST of claim 13, wherein the platform layer system is a Basic Input/Output System (BIOS).

* * * * *